(12) United States Patent
Nakai et al.

(10) Patent No.: US 7,757,180 B2
(45) Date of Patent: Jul. 13, 2010

(54) PRINT CONTROL OPERATION SYSTEM USING ICONS

(75) Inventors: Yasuhiro Nakai, Souraku-gun (JP); Masakatsu Nakamura, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 2078 days.

(21) Appl. No.: 09/833,651

(22) Filed: Apr. 13, 2001

(65) Prior Publication Data

US 2002/0021310 A1 Feb. 21, 2002

(30) Foreign Application Priority Data

May 26, 2000 (JP) ............................. 2000-157086

(51) Int. Cl.
*G06F 3/048* (2006.01)

(52) U.S. Cl. .................. 715/769; 715/839; 715/835

(58) Field of Classification Search ............... 345/769, 345/775, 839, 764; 715/527, 769, 835, 839
See application file for complete search history.

(56) References Cited

U.S. PATENT DOCUMENTS

| | | | | | |
|---|---|---|---|---|---|
| 5,060,135 | A | * | 10/1991 | Levine et al. ............... | 345/769 |
| 5,546,527 | A | * | 8/1996 | Fitzpatrick et al. ........... | 345/769 |
| 5,638,505 | A | * | 6/1997 | Hemenway et al. .......... | 345/769 |
| 5,745,112 | A | * | 4/1998 | Hirose ....................... | 345/769 |
| 6,697,090 | B1 | * | 2/2004 | Nagasaka et al. ............ | 715/769 |
| 7,065,716 | B1 | * | 6/2006 | Rzepkowski et al. ........ | 715/839 |
| 7,130,070 | B2 | * | 10/2006 | Evans et al. ................ | 358/1.15 |
| 7,216,304 | B1 | * | 5/2007 | Gourdol et al. ............. | 715/835 |

FOREIGN PATENT DOCUMENTS

| | | |
|---|---|---|
| JP | 6-59838 A | 3/1994 |
| JP | 06-348793 | 12/1994 |
| JP | 07-319659 | 12/1995 |
| JP | 07-325692 | 12/1995 |
| JP | 8-511637 A | 12/1996 |
| JP | 10-003355 | 1/1998 |
| JP | 10-326167 | 12/1998 |
| JP | 11-115279 | 4/1999 |
| JP | 11-203282 | 7/1999 |
| JP | 11-334180 | 12/1999 |
| JP | 11-338611 | 12/1999 |
| JP | 2000-187564 | 7/2000 |
| WO | 94/29787 | 12/1994 |

OTHER PUBLICATIONS

Japanese Office Action mailed Dec. 1, 2004 (w/English translation).

* cited by examiner

*Primary Examiner*—Namitha Pillai
(74) *Attorney, Agent, or Firm*—Nixon & Vanderhye P.C.

(57) ABSTRACT

A print control operation system using icons including a display picture for displaying a print icon having predetermined set print conditions and a file icon of a file to be printed. By dragging the file icon and dropping the file icon on the print icon, print processing of the file is executed under the print conditions predetermined in the print icon. The print conditions predetermined in the print icon are displayed on the display picture in a recognizable display form

3 Claims, 12 Drawing Sheets

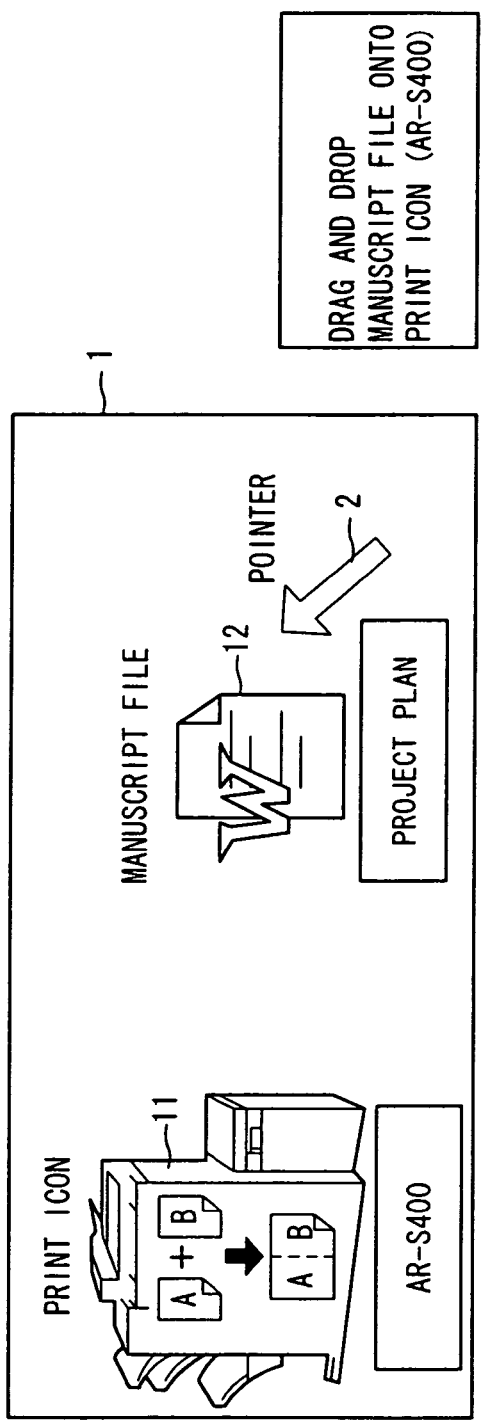
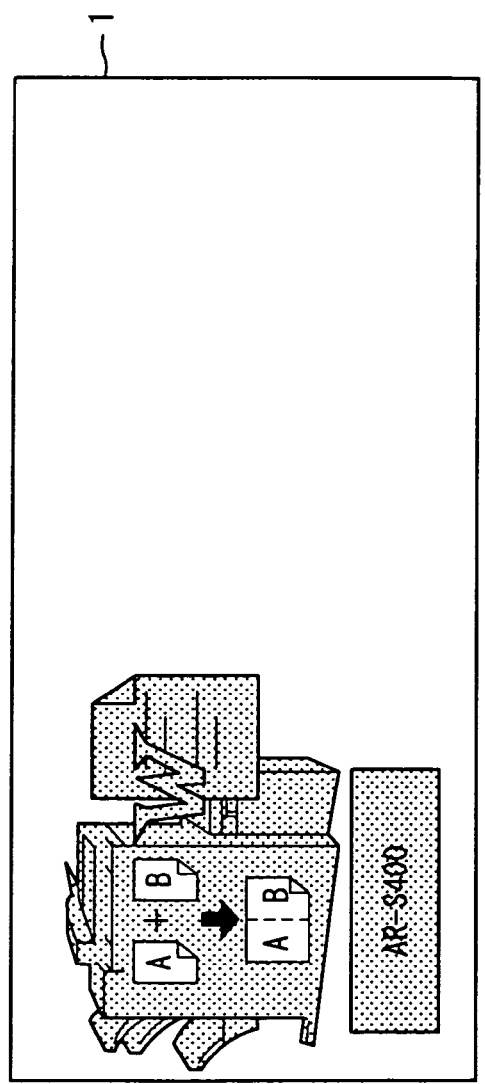
Fig. 1A
Fig. 1B

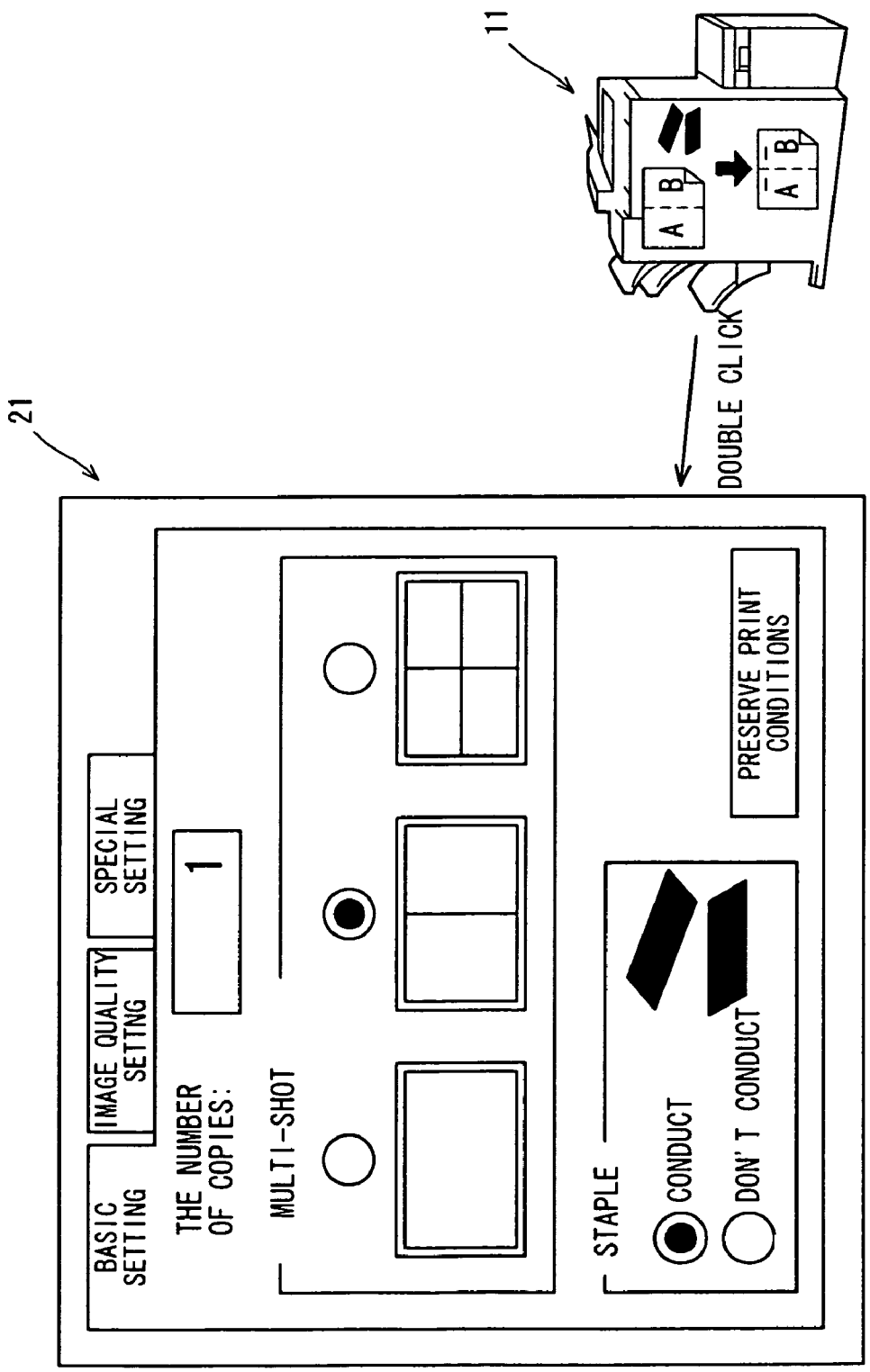

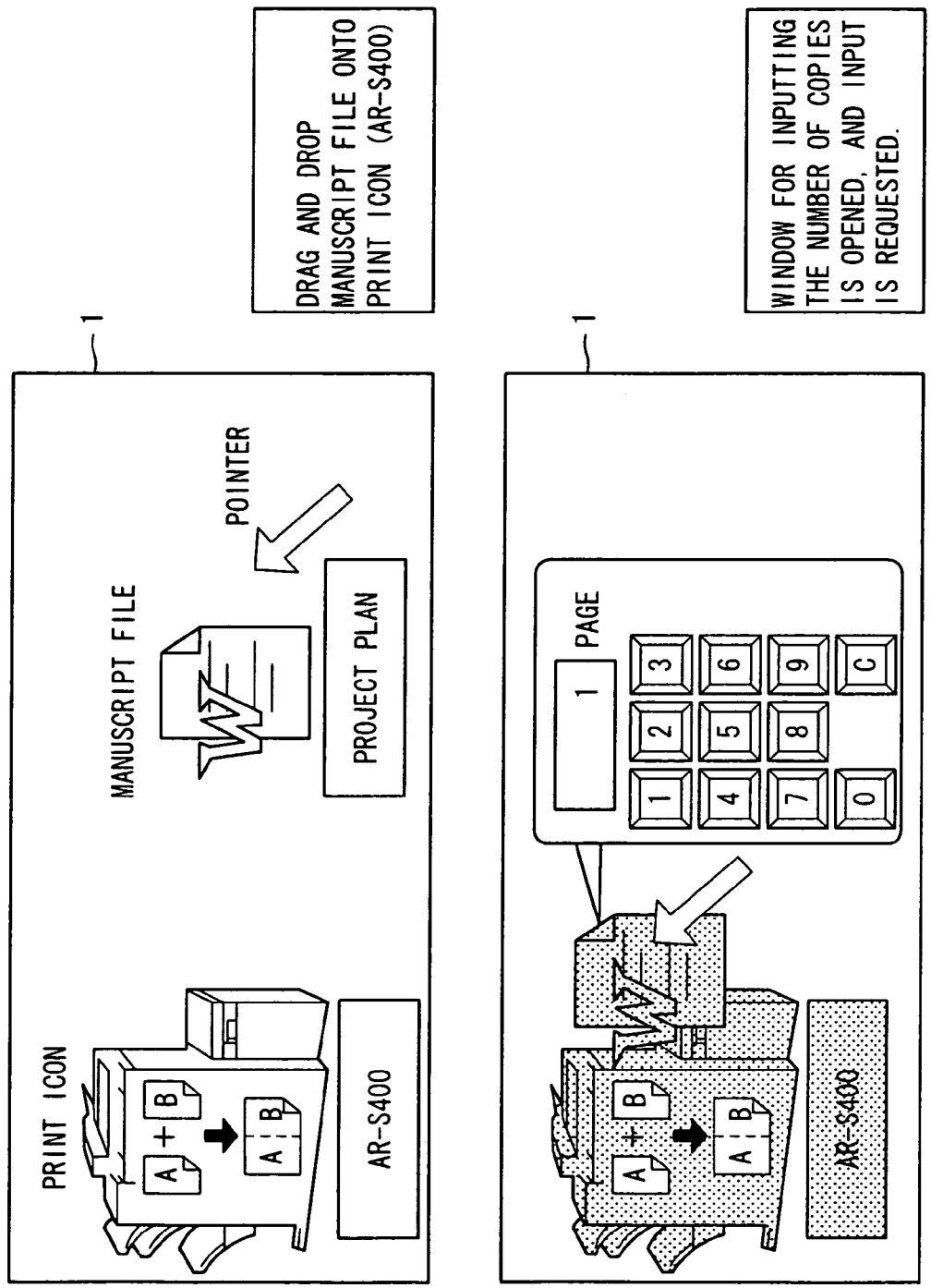

Fig. 8
| MANAGEMENT NUMBER | ICON IMAGE | OUTPUT FORM | THE NUMBER OF COPIES |
|---|---|---|---|
| 1 | 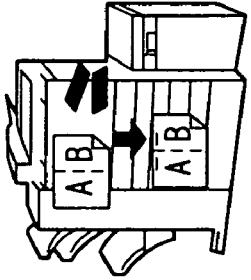 | 2-UP WITH STAPLE | 1 COPY |
| 2 | 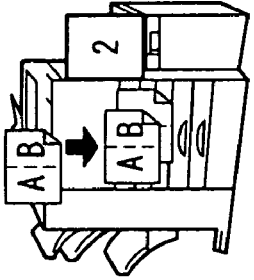 | 2-UP | 2 COPIES |
| 3 | 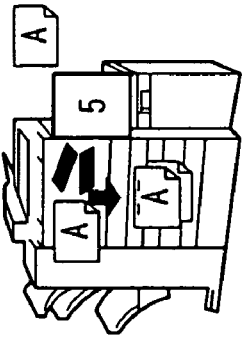 | 1-UP WITH STAPLE | 5 COPIES |

Fig. 12

| FUNCTION | | BOTH SIDE PRINTING | | STAPLE | | MULTI-SHOT | | | THE NUMBER B OF COPIES |
|---|---|---|---|---|---|---|---|---|---|
| | | ON | OFF | ON | OFF | 1 in 1 | 2 in 1 | 4 in 1 | |
| BOTH SIDE PRINTING | ON | BOTH SIDE ON | BOTH SIDE ON | BOTH SIDE ON | BOTH SIDE ON | BOTH SIDE ON | BOTH SIDE ON | BOTH SIDE ON | BOTH SIDE ON |
| | OFF | BOTH SIDE ON | BOTH SIDE OFF | BOTH SIDE OFF | BOTH SIDE OFF | BOTH SIDE OFF | BOTH SIDE OFF | BOTH SIDE OFF | BOTH SIDE OFF |
| STAPLE | ON | STAPLE ON | STAPLE ON | STAPLE ON | STAPLE ON | STAPLE ON | STAPLE ON | STAPLE ON | STAPLE ON |
| | OFF | STAPLE OFF | STAPLE OFF | STAPLE OFF | STAPLE OFF | STAPLE OFF | STAPLE OFF | STAPLE OFF | STAPLE OFF |
| MULTI-SHOT | 1 in 1 | 1 in 1 | 1 in 1 | 1 in 1 | 1 in 1 | 1 in 1 | 2 in 1 | 4 in 1 | 1 in 1 |
| | 2 in 1 | 2 in 1 | 2 in 1 | 2 in 1 | 2 in 1 | 2 in 1 | 2 in 1 | 4 in 1 | 2 in 1 |
| | 4 in 1 | 4 in 1 | 4 in 1 | 4 in 1 | 4 in 1 | 4 in 1 | 4 in 1 | 4 in 1 | 4 in 1 |
| THE NUMBER A OF COPIES | | THE NUMBER A OF COPIES | THE NUMBER A OF COPIES | THE NUMBER A OF COPIES | THE NUMBER A OF COPIES | THE NUMBER A OF COPIES | THE NUMBER A OF COPIES | THE NUMBER A OF COPIES | THE NUMBER B OF COPIES (B>A) |

FUNCTION SETTING OF ICON B

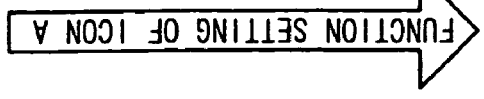
FUNCTION SETTING OF ICON A

PRINT CONTROL OPERATION SYSTEM USING ICONS

BACKGROUND OF THE INVENTION

1. Field of the Invention

The present invention relates to an operation system for starting processing with a drag and drop operation of icons. In particular, the present invention relates to a print control operation system in the case where printing is conducted by using a printer.

2. Description of the Prior Art

As a print output ordering method on an application, there is a method of giving a print order in such a state that a file (data) is opened on the application, opening a property of a printer each time, ordering various print conditions, such as both side recording, covered binding, whether there is a staple, and the number of output copies, as occasion demands, and causing output processing to be executed.

When thus ordering that a desired file should be printed, it is typical that a file is opened necessarily on an application and then printing is ordered. If a desired file is opened on the application each time, however, there is a problem that the operation efficiency is poor and it takes a long time to set output conditions.

As a method for solving this problem, there is a known technique in which print processing is started by so-called drag and drop operation, i.e., dragging an icon representing a document, and superposing and dropping the icon on an icon representing a printer.

In a printer control system disclosed in Japanese Patent Application Laid-Open Hei 06 No. 059838, drag and drop operation is detected, and document outputs or document output waiting states connected to a plurality of printers are displayed with icons on the operation screen together with icons representing printers. Furthermore, drag and drop operation is detected, an output destination of a document is altered, an output waiting state of the printer after alteration is displayed with an icon on the operation screen together with an icon representing the printer. Owing to this technique, a job in a queue can be operated by operating icons. For conducting such a different operation, therefore, it is not necessary to display a window. Accordingly, the operation for opening and closing the window can be made unnecessary.

In Japanese Patent Application disclosure Hei 08 No. 511637, there are disclosed a graphical user interface and a method for selectively opening a container object at the time of drag and drop operation. In the case where a window including an icon of drop destination is closed, the closed window is automatically opened in this technique by dragging a different icon onto an icon representing the closed window and conducting some operation. Owing to this technique, the inside of an enclosure can be seen during the drag operation. It is also possible to open the hierarchy of an enclosure contained in a newly opened window. Accordingly, it is possible to access the whole hierarchy of the storage system. As a result, a duplication function and a movement function possessed by the graphical user interface based on the window and icon are improved.

For example, in the case of start of print processing, however, printing might be desired with setting such as paper to be used or specification of reduction printing altered. In such a case, it is impossible in the conventional technique to alter the setting of processing to be started, by dropping. In such a case, it is necessary in the conventional technique to open a file on an application, alter the print processing setting, and then execute printing.

SUMMARY OF THE INVENTION

In view of such a problem, the present invention has been made. An object of the present invention is to provide such a print control operation system using icons that when conducting printing after altering print processing setting, print processing can be made without opening a file to be printed, on an application.

The object is achieved by the following aspects of the present invention.

In accordance with a first aspect of the present invention, a print control operation system using icons including a display picture for displaying a print icon having predetermined print conditions and a file icon of a file to be printed, print processing of the file being executed under the predetermined print conditions in the print icon by dragging the file icon and dropping the file icon on the print icon, is characterized in that the predetermined print conditions in the print icon are displayed on the display picture in a recognizable display form.

In accordance with a second aspect of the present invention, the print control operation system using icons having the first feature is further characterized in that, at a time point when a file icon of a file to be printed is superposed on the print icon, an outline of the print conditions preset in the print icon is displayed on the display picture.

In accordance with a third aspect of the present invention, the print control operation system using icons having the first feature is further characterized in that, at a time point when a file icon of a file to be printed is superposed on the print icon, a printing preview of the file icon is displayed on the display picture.

In accordance with a fourth aspect of the present invention, the print control operation system using icons having the first feature is further characterized in that, when a plurality of file icons of files to be printed are dragged and dropped on the print icon, these files are consecutively subject to print processing as a series of recorded matters.

In accordance with a fifth aspect of the present invention, the print control operation system using icons having the first feature is further characterized in that, when a file icon of a file to be printed is dragged and dropped on the print icon, a window for setting print conditions of the print icon is opened.

In accordance with a sixth aspect of the present invention, the print control operation system using icons having the first feature is further characterized in that, when a file icon is dragged and dropped on the print icon, a printer capable of conducting print processing is automatically selected based on print conditions set in the print icon.

In accordance with a seventh aspect of the present invention, the print control operation system using icons having the sixth feature is further characterized in that, when a file icon is dragged and dropped on the print icon in a printer capable of conducting print processing is automatically selected from among printers in a stand-by state, based on print conditions set in the print icon.

In accordance with an eighth aspect of the present invention, the print control operation system using icons having the sixth feature is further characterized in that, a printer to be used is set in the print icon as one of set conditions of the print icon, a state of the printer is monitored in the print control operation system, and when the printer is in such a state that the printer cannot execute processing set in the print icon, the print icon is controlled so as not to be displayed.

In accordance with a ninth aspect of the present invention, a print control operation system using icons including a display picture for displaying a print icon having predetermined print conditions and a file icon of a file to be printed, print processing of the file being executed under the print conditions predetermined in the print icon by dragging the file icon and dropping the file icon on the print icon, is characterized in that the print control operation system is formed so as to create a print icon having new print conditions set therein, when a predetermined plurality of print icons displayed on the display screen and respectively having different print conditions are coupled.

According to the present invention, a file can be printed under frequently utilized print conditions by the drag and drop operation without opening the file on an application. Furthermore, by only watching the icon display on the operation picture, set print conditions can be known.

Furthermore, according to the present invention, the user can easily recognize print conditions set in the print icon.

Furthermore, according to the present invention, the user can confirm contents of a file to be printed thereafter without opening the file on an application.

Furthermore, according to the present invention, integrated print processing of a plurality of files becomes possible.

Furthermore, according to the present invention, print conditions can be set when the user drags and drops a file to printed, and consequently the trouble in especially opening the setting picture can be eliminated.

Furthermore, according to the present invention, a printer capable of executing print conditions previously ordered as a print icon is automatically selected from among a plurality of printers connected to the network. Accordingly, without giving a print job order after confirming and grasping situations of all printers; therefore, it becomes possible to output with a simple operation order.

Furthermore, according to the present invention, a printer capable of immediately executing print conditions previously ordered as a print icon is automatically selected from among a plurality of printers connected to the network. Therefore, rapid output becomes possible.

Furthermore, according to the present invention, if a printer capable of executing print conditions previously ordered as a print icon does not exist on the network, a print order cannot be given to the print icon.

Furthermore, according to the present invention, print conditions set in respective print icons are combined and a great variety of print processing becomes possible.

BRIEF DESCRIPTION OF THE DRAWINGS

FIGS. 1A and 1B are diagrams showing drag and drop operation in accordance with an embodiment of the present invention;

FIG. 2 is a diagram showing a property setting picture for setting print conditions in accordance with the embodiment of the present invention;

FIGS. 3A and 3B are diagrams showing print condition setting processing in accordance with the embodiment of the present invention;

FIG. 8 is a diagram showing a management table of a plurality of print icons applied to the embodiment of the present invention;

FIG. 12 is a diagram showing a function priority matrix table of icons A and B when they are coupled, applied to the embodiment of the present invention.

DESCRIPTION OF THE PREFERRED EMBODIMENTS

Figure 4A:
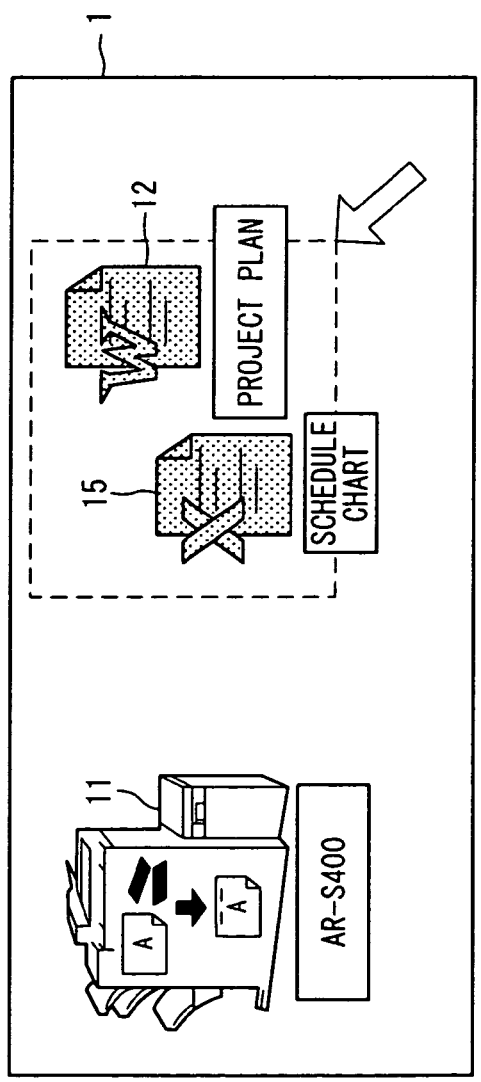
FIGS. 4A and 4B are diagrams showing such print processing that a plurality of file icons are dragged and dropped simultaneously in accordance with the embodiment of the present invention.

Hereafter, embodiments of a print control operation system using icons, according to the present invention, shall be described. FIGS. 1A and 1B are diagrams showing drag and drop operation in the present embodiment.

In the case where printing is conducted by using icons, printing of a default can be conducted simply by dragging an icon of a file and superposing and dropping it on a print icon (drag and drop operation).

In the present embodiment, print conditions (such as the paper size, both sides/one side, and an output location) can be set on the print icon. By dragging and dropping an icon of a file to be printed on the print icon subjected to the condition setting, printing can be executed under the set conditions in the present embodiment.

In the system of the present embodiment, a print icon 11 and an icon representing a manuscript file as a file icon, i.e., a manuscript file icon 12 and a manuscript file icon 12 are displayed on a desktop 1 of a personal computer or the like as shown in FIGS. 1A and 1B. At least the manuscript file icon 12 can be moved by a pointer 2.

Hereafter, a specific method of this operation will be described.

First, as shown in FIG. 1A, the user superposes the pointer 2 on the manuscript file icon 12, and moves the pointer 2 to an arbitrary position while pressing a button of a mouse (not illustrated) (drug operation). And in such a state that the manuscript file icon 12 is superposed on the print icon 11 as shown in FIG. 1B, the user releases the mouse button. Thereupon, the manuscript file icon 12 is fixed on such a position as to superpose on the print icon 11. Under conditions set in the print icon 11, print processing is executed.

In the case where file printing is conducted in this operation, the printing is executed on the basis of conditions set in the print icon 11. Since the user wants to alter the setting of print conditions in some cases, however, it is so configured that the print conditions in the print icon 11 can be altered.

A method for setting the print conditions in this print icon 11 will now be described. FIG. 2 illustrates a diagram showing a property setting picture for setting print condition in the present embodiment. By conducting double click in such a position that the pointer is superposed on the print icon 11 as shown in FIG. 2, a property setting picture 21 is opened. On this property setting picture 21, the user sets print conditions freely, and then clicks a printing condition preservation key. Thereupon, the set conditions are preserved in the print icon 11. Thus, in the case where the user wants to alter the print processing conditions and then print a file, it becomes possible for the user to alter the setting of the print conditions of the print icon 11 and then can execute the printing by the drag and drop operation of the file icon. In this way, the operation can be executed without the necessity of opening an application.

In the print icon, it is not always necessary to predetermine all conditions. In an alternative configuration, as for partial conditions that are frequently subject to setting alteration, an input window maybe automatically opened when drag and drop operation of the file icon 12 is conducted. FIGS. 3A and 3B are diagrams showing this configuration. In another alternative configuration, a copy number input picture 14 is opened as shown in FIG. 3B, when the manuscript file icon 12 shown in FIG. 3A is dragged and dropped on the print icon 11. The number of copies is set, and then print processing is conducted. In this case, setting conditions other than the number of copies follow the conditions predetermined for the print icon.

The above described print icon 11 can be formed so that the display may be altered according to the setting of the print conditions. The user can confirm the print conditions easily, and the usefullness is improved. The print icon 11 illustrated in FIGS. 1A and 1B shows that there are set such conditions that multi-shot (2 in 1) is conducted, i.e., two manuscripts are printed on one sheet of paper, and staple processing is not conducted.

By such a configuration that the user can easily confirm the set print conditions in the print icon, the usefulness of the system of the present embodiment can be improved. In other words, if the setting picture shown in FIG. 2 must be opened in order to confirm the conditions set in the print icon 11, the user must remember the set conditions. If the user does not remember, then the user must open the setting picture and confirm the conditions whenever printing a file, resulting in inconvenience. Furthermore, if the user misunderstands conditions set in the print icon, and executes print processing without confirming the set conditions, then there is also a fear that a printed matter that is not desired by the user will be obtained. In the present embodiment, such an inconvenience is eliminated, and print processing based on desired print conditions can be conducted rapidly.

Figure 5:
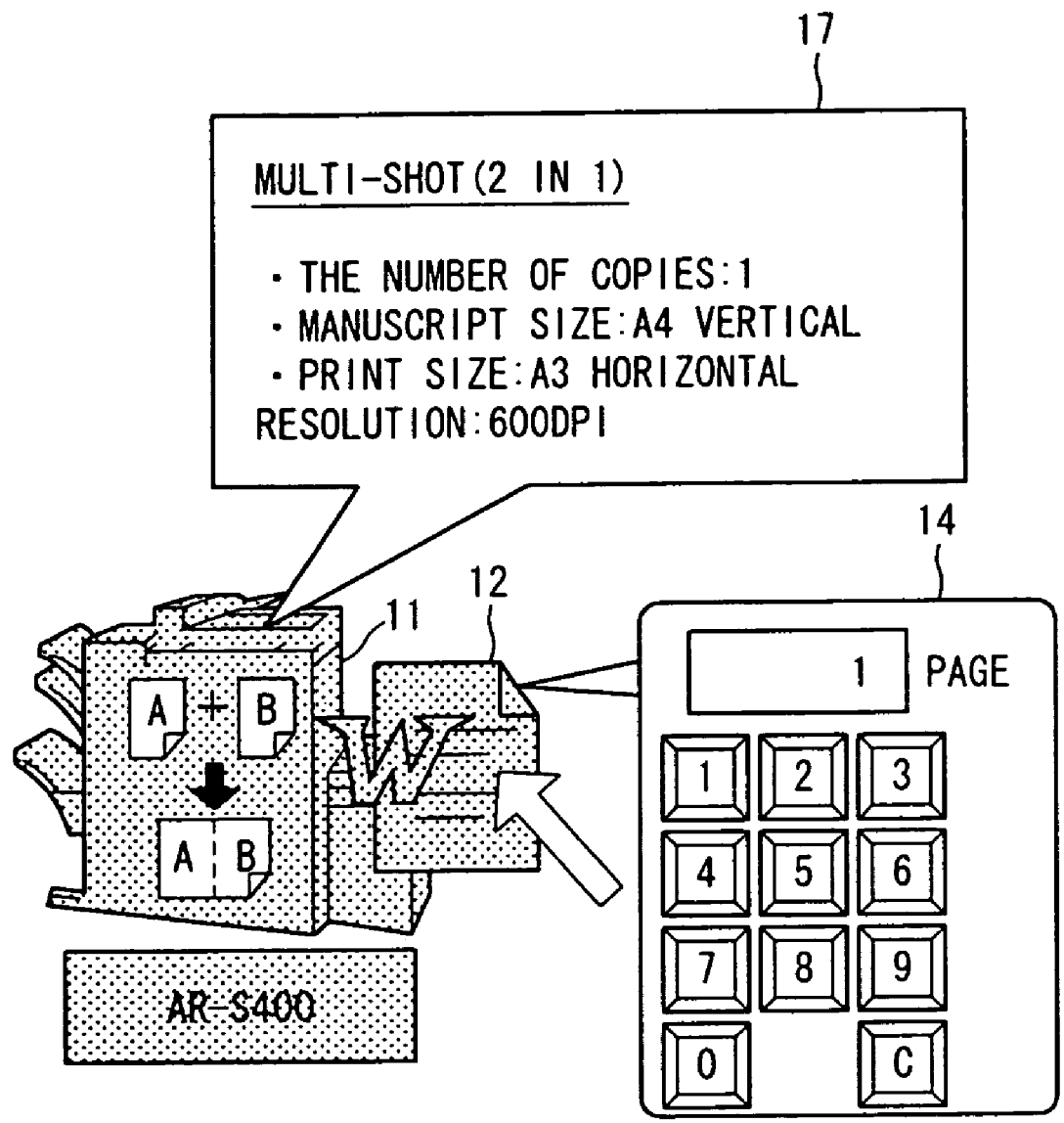
FIG. 5 is a diagram showing a method for confirming print conditions applied to the embodiment of the present invention.

As a method for confirming the print conditions, it is also possible as shown in FIG. 5 that a window 17 for displaying print conditions set in the print icon 11 is automatically opened when the user has dragged the file icon 12 to be printed onto the print icon 11, the user confirms the print conditions by watching the window 17 and then drops the file icon 12, and thereby printing is executed.

Figure 6:
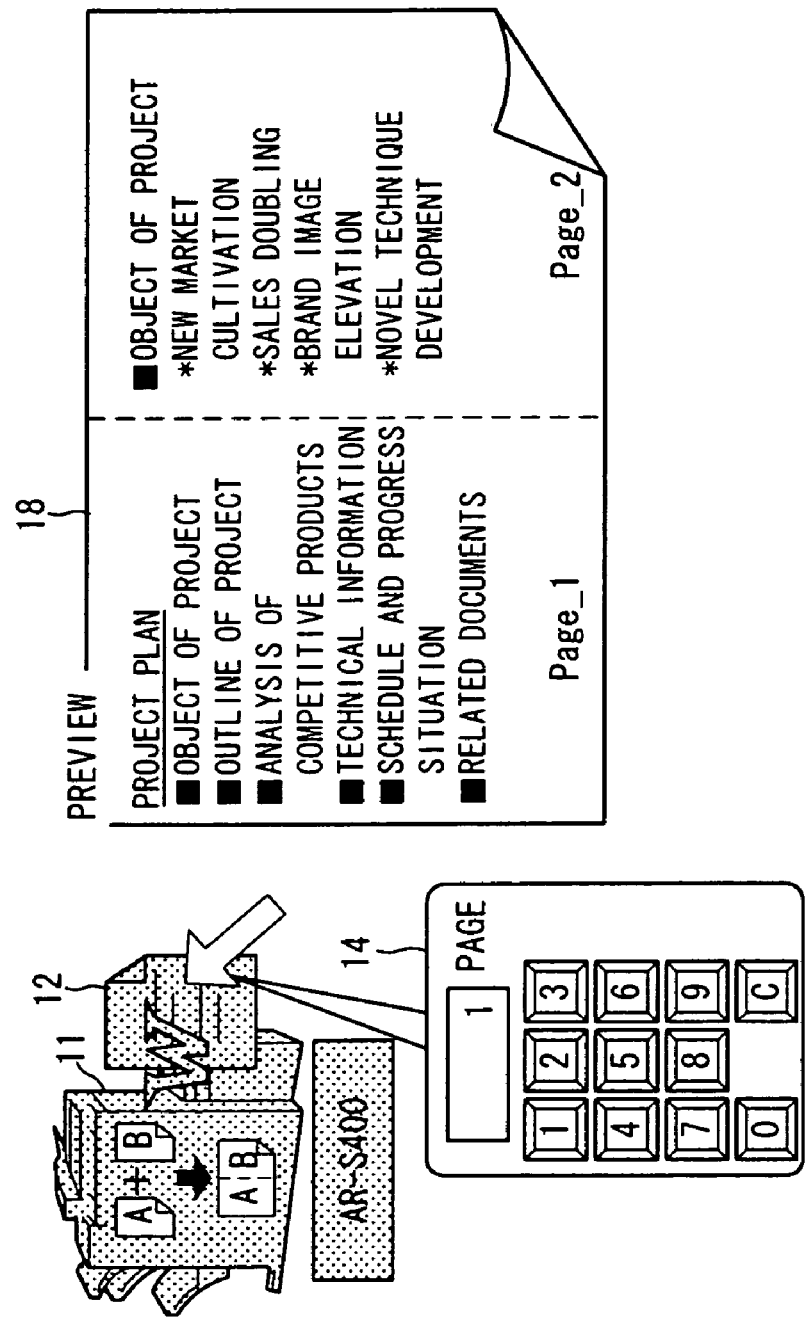
FIG. 6 is a diagram showing a preview of a file to be printed, applied to the embodiment of the present invention.

Furthermore, in the system of the present embodiment, the file to be printed is subject to print processing without being opened on the application. In the case where there is another file having a similar file name, therefore, the user might print the different file by mistake. For preventing such a trouble, there can be adopted such a configuration that a window 18 f or displaying a preview of the file is automatically opened as shown in FIG. 6 when the user has dragged the file icon 12 to be printed onto the print icon 11. The user can confirm the contents of the file by watching the window 18. Thereafter, printing is executed by dropping the file icon 12.

Figure 4B:
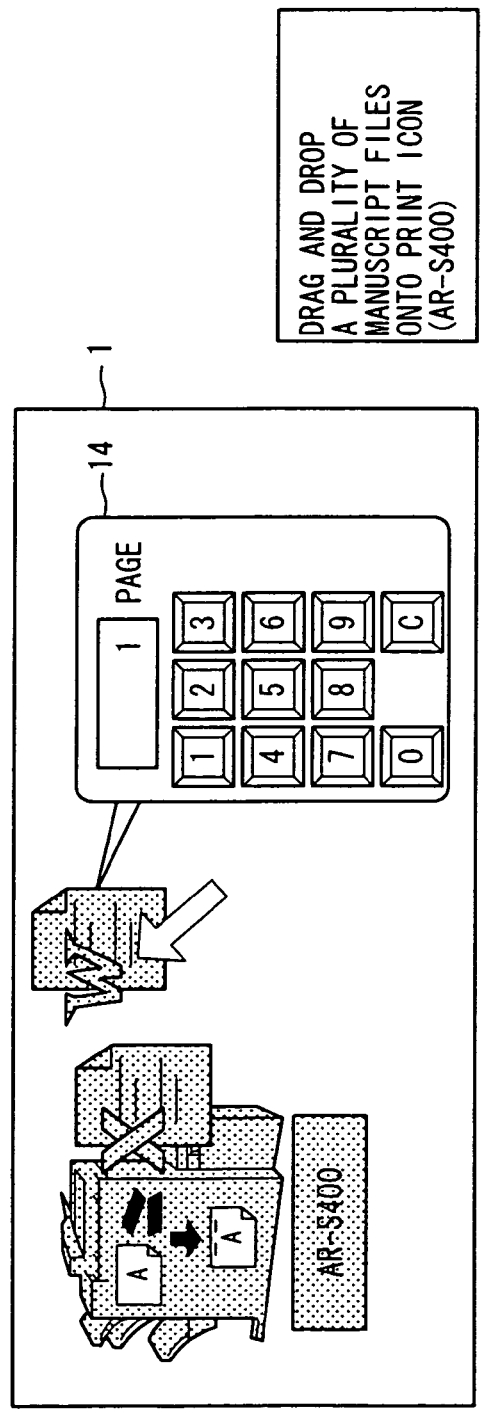
Figure 7:
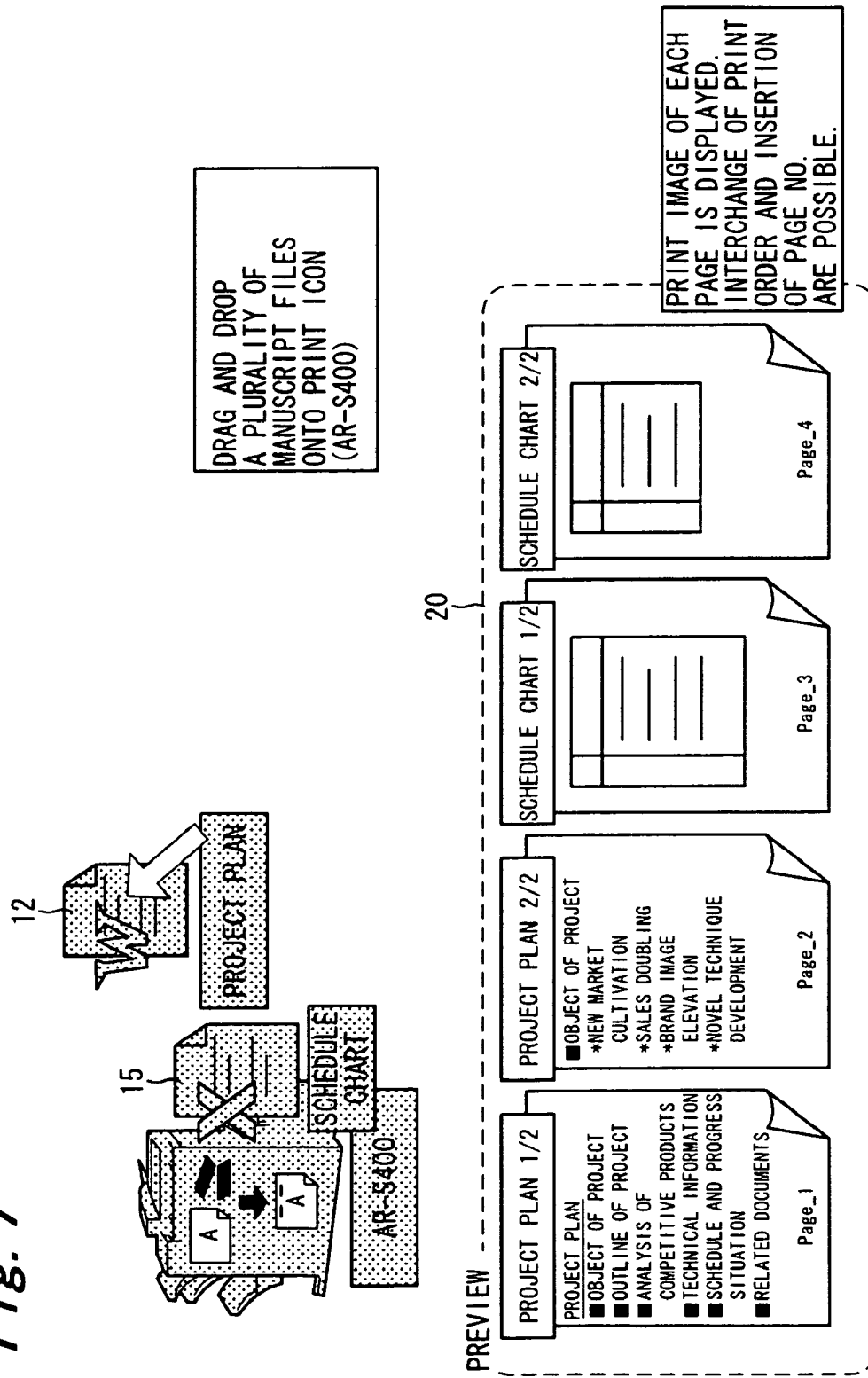
FIG. 7 is a diagram showing print processing of a plurality of files applied to the embodiment of the present invention.

Furthermore, it is also possible to print out a plurality of files en bloc by dragging and dropping a plurality of file icons 12 and 15 onto the print icon 11 shown in FIG. 4A simultaneously as shown in FIG. 4B. FIG. 7 is a diagram showing such print processing of a plurality of files. In the case where a file 12 of a project plan and a file 15 of a schedule chart, which are originally separate files, are to be printed simultaneously by dragging and dropping a plurality of file icons 12 and 15 onto the print icon 11, a series of recording matters are subject to print processing on the basis of information of the files 12 and 15. The recording matters are output with a series of page numbers so as to be able to be recognized as a series of recording matters.

Figure 11:
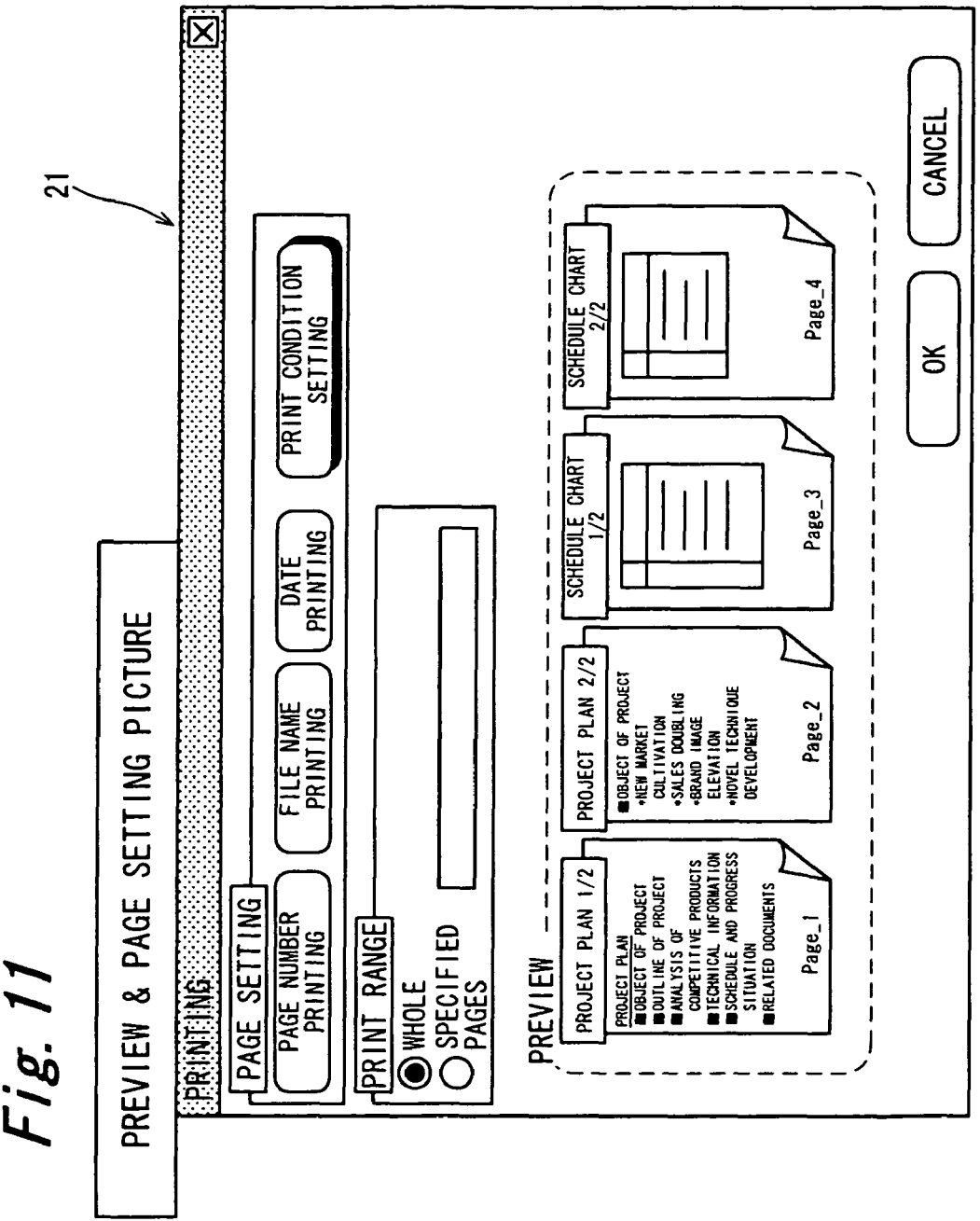
FIG. 11 is a diagram showing a preview and page setting picture in the case where two files have been dragged and dropped onto a print icon, applied to the embodiment of the present invention.

In this case, it is also possible to open a preview and page setting picture 21 as shown in FIG. 11 so as to allow various kinds of setting, when the files 12 and 15 are dragged and dropped onto the print icon. Furthermore, if a plurality of files are thus dragged and dropped, then a setting picture for printing a page number, a file name, and date is displayed. Furthermore, it is also possible to set a print range. By clicking a print condition setting key, it is also possible to alter the setting of the print conditions (various functions). By dragging each page on a preview picture 20, interchange of pages can be conducted. At that time, page information is also re-assigned automatically.

Furthermore, it is also possible to create a plurality of print icons on the desktop. If there is only one print icon in the case where there are a plurality of frequently used print conditions, the frequency of setting alteration at the time of printing becomes high and the burden of the user becomes heavy. If a plurality of print icons differing in setting are displayed, then a printed matter printed under desired conditions can be obtained by only changing the drop destination of a file icon to be printed.

In the case where a plurality of print icons are displayed, they are managed by a management table as shown in FIG. 8. By thus managing setting conditions (such as the output form, and the number of copies) of respective print icons, control hereafter described becomes possible.

For example, it is now assumed in the system of the present embodiment that a plurality of printers are connected to a network and an arbitrary printer can be selected to execute print processing. When in this case a print order is issued by dragging and dropping a file icon onto a certain print icon, a printer capable of conducting processing can be automatically selected on the basis of print conditions registered in that print icon. If at this time a printer is selected from among printers that are in the stand-by state at that time point, then more preferably printing can be conducted rapidly.

Furthermore, it is also possible to set a printer to be used, in each print icon as a condition. In this case, however, the state of a printer set in each print icon is confirmed, and a print icon of a printer that cannot conduct processing is prevented from being displayed. For example, if staple processing is set in a print icon and the set printer staple runs out, then the print icon is not displayed. Also in the case where the power supply of a set printer is not on, the print icon is not displayed. Or it is also possible to conduct gray-out display of a print icon that cannot be processed and explicitly indicate that the function is inhibited.

Figure 9:
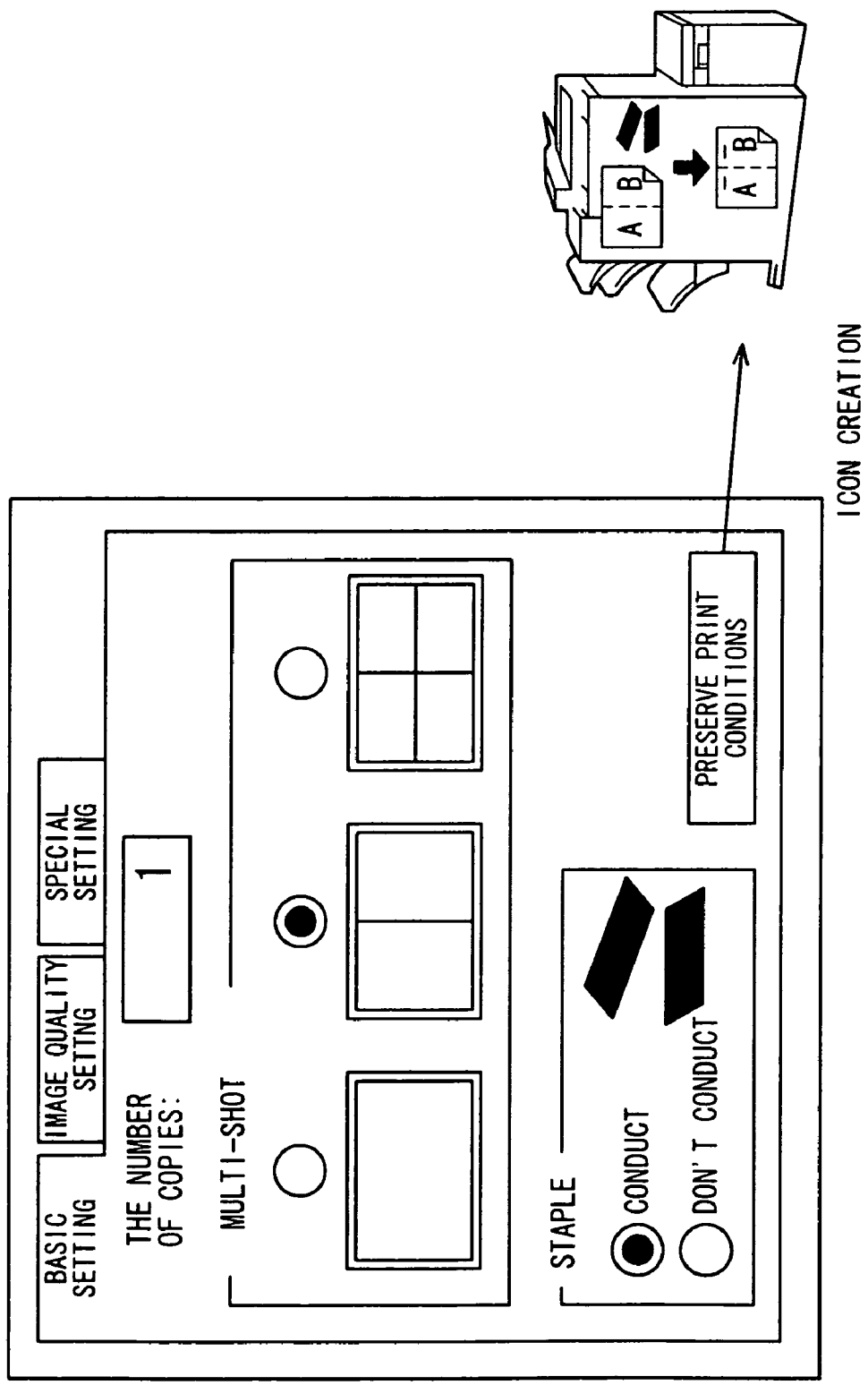
FIG. 9 is a diagram showing a method for newly creating a print icon applied to the embodiment of the present invention.

In the system of the present embodiment, furthermore a print icon can also be newly created on the desktop. In this case, for example, print conditions are first set on the property setting picture as shown in FIG. 9 and the print condition preservation key is clicked. As a result, a print icon having these conditions set therein is created.

Figure 10:
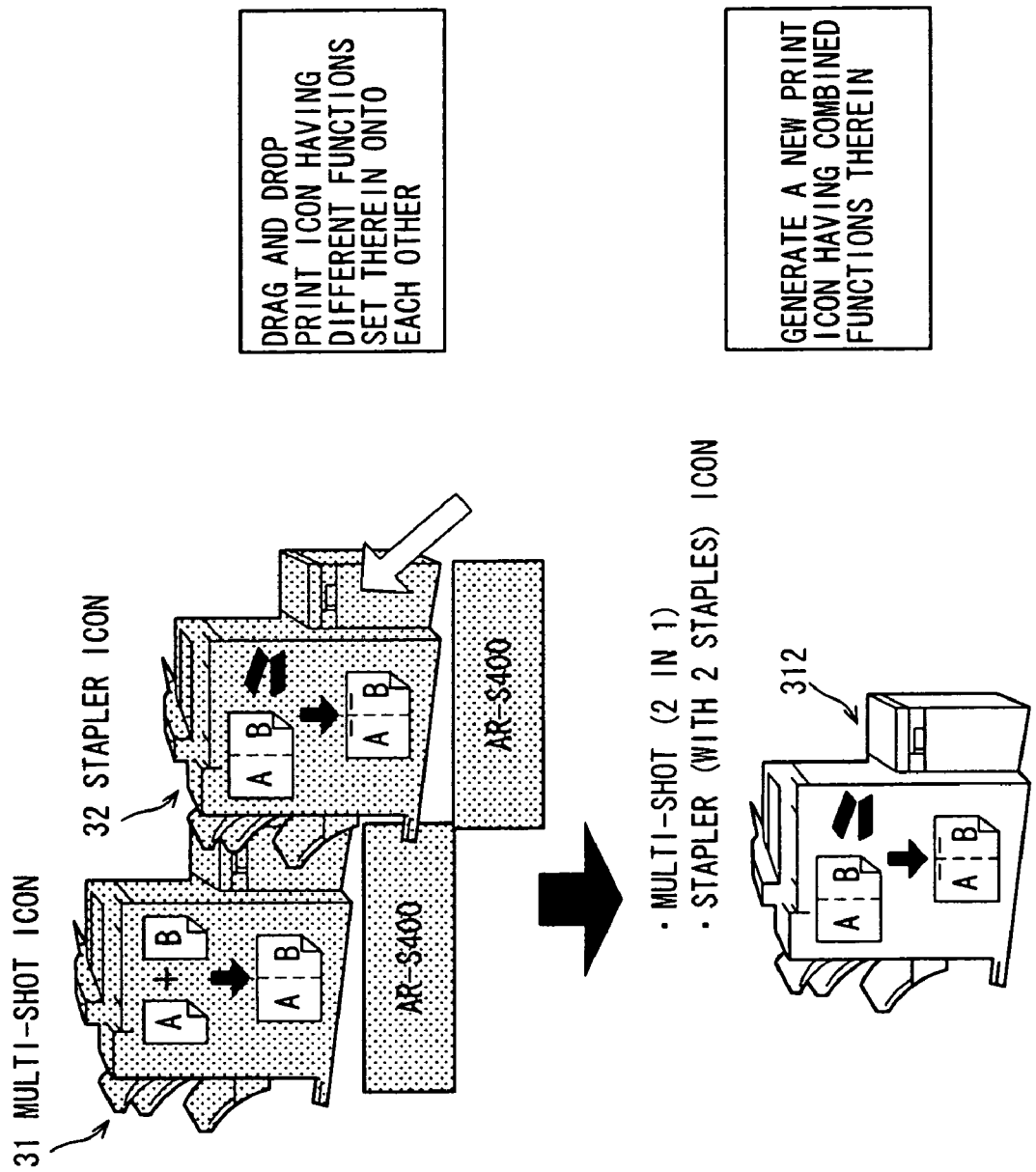
FIG. 10 is a diagram showing a method of coupling two print icons applied to the embodiment of the present invention.

Furthermore, it is also possible to couple a plurality of print icons having different print conditions previously registered therein and create a print icon having new print conditions registered therein. For example, when there are a print icon 31 having multi-shot processing set therein and a print icon 32 having staple processing set therein as shown in FIG. 10, a print icon 312 having both the multi-shot processing and the staple processing set therein is generated by dragging one of the icons and dropping it onto the other of the icons.

As an example of this configuration, the case where icons A and B having "both side print," "staple," and "multi-shot" as set functions are coupled will now be described. FIG. 12 shows a function priority matrix table of the icons A and B.

In the case where the function setting contents of the icon B is added to the function setting state of the icon A, the contents of setting are determined according to contents prescribed by a priority matrix table of each function as shown in FIG. 12. Print processing is conducted on the basis of the set print conditions.

As heretofore described, the print control operation system using icons of the present invention is formed so as to display print conditions, which are predetermined in the print icon, on the display picture in a recognizable display form. Without opening a file on an application, therefore, the file can be printed simply and rapidly under frequently utilized print conditions by drag and drop operation. In addition, it is possible to know the set print conditions by only watching the icon display on the operation picture. Thus, the confirmation work is easy and false printing can be prevented.

At a time point when a file icon of a file to be printed is superposed in the configuration of the present invention, an outline of the print conditions preset in the print icon may be displayed on the display picture. In the case of such a configuration, the user can easily recognize print conditions, which is convenient to the user.

At a time point when a file icon of a file to be printed is superposed on the print icon in the configuration of the present invention, a printing preview of the file icon may be displayed on the display picture. In the case of such a configuration, the user can confirm contents of a file to be printed thereafter without opening the file on an application. Thus, printing can be conducted efficiently and positively.

When a plurality of file icons of files to be printed are dragged and dropped on the print icon in the configuration of the present invention, these files may be consecutively subject to print processing as a series of recorded matters. In the case of such a configuration, integrated print processing of a plurality of files becomes possible. Thus, printing can be conducted efficiently, and a great variety of printing forms can be coped with.

When a file icon of a file to be printed is dragged and dropped on the print icon in the configuration of the present invention, a window for setting print conditions of the print icon may be opened. In the case of such a configuration, print conditions can be set when the user drags and drops a file to printed, and consequently the trouble in especially opening the setting picture can be eliminated. Thus, easy and rapid print processing can be conducted.

When a file icon is dragged and dropped on the print icon in the configuration of the present invention, a printer capable of conducting print processing may be automatically selected based on print conditions set in the print icon. In the case of such a configuration, a printer capable of executing print conditions previously ordered as a print icon is automatically selected from among printers connected to the network. Thus, output becomes possible with a simple operation order. In the case where a printer in a stand-by state is automatically selected, a printer capable of immediately executing the print conditions is automatically selected. Thus, more rapid output becomes possible.

When the printer is in such a state that the printer cannot execute processing set in the print icon in the configuration of the present invention, the print icon may be controlled so as not to be displayed. In the case of such a configuration, an order cannot be given from the beginning to the print icon that is in such a condition as not to be able to conduct the print processing. Thus, confusion is avoided.

Furthermore, the print control operation system of the present invention is formed so as to create a print icon having new print conditions set therein, when a plurality of print icons displayed on the display screen and respectively having different print conditions are coupled. Therefore, print conditions are combined and a great variety of print processing becomes possible. Thus, various print forms can be coped with.

What is claim is

1. A print control operation system comprising:
a mouse device;
the print control operation system using icons including a display picture for displaying a print icon having predetermined print conditions and a file icon of a file to be printed, print processing of said file being executed under the predetermined print conditions in said print icon by dragging said file icon and dropping said file icon on said print icon, wherein
said dragging said file icon and said dropping said file icon is performed by using said mouse device,
wherein the print icon is formed so that the display is altered according to a setting of the print conditions in said print icon, and said print conditions are displayed on said display picture in a recognizable display form when the file icon is not located over the print icon, and
wherein the print icon to which the file icon is dragged and dropped is an icon which limits on a specific function among print processing functions provided in a corresponding printer, and which issues a print command by a function which specifies the file icon for the printer when the file icon is dragged and dropped on the print icon, and wherein the print icon can be generated on a screen of the display as a printer icon which is capable of directly designating at least one frequently used function among print processing functions possessed by the printer.

2. A print control operation system using icons according to claim 1, wherein at a time point when a file icon of a file to be printed is superposed on said print icon, an outline of the print conditions preset in said print icon is displayed on said display picture.

3. A print control operation system using icons according to claim 1, wherein at a time point when a file icon of a file to be printed is superposed on said print icon, a printing preview of the file icon is displayed on said display picture.

* * * * *